J. O. SHAFER.
PLOW HITCH.
APPLICATION FILED NOV. 6, 1915.
1,211,968.
Patented Jan. 9, 1917.
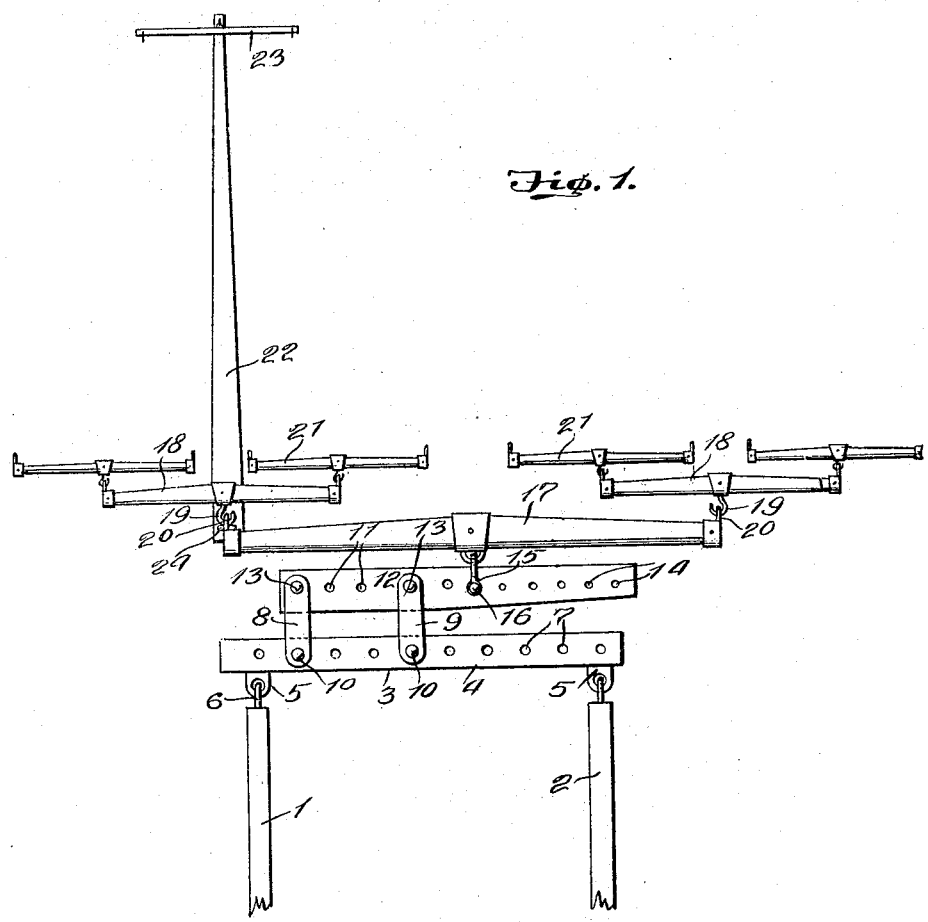

UNITED STATES PATENT OFFICE.

JAMES O. SHAFER, OF CLAREMONT, ILLINOIS.

PLOW-HITCH.

1,211,968.  Specification of Letters Patent.  Patented Jan. 9, 1917.

Application filed November 6, 1915.  Serial No. 59,987.

*To all whom it may concern:*

Be it known that I, JAMES O. SHAFER, a citizen of the United States, residing at Claremont, in the county of Richland and State of Illinois, have invented certain new and useful Improvements in Plow-Hitches, of which the following is a specification.

My invention relates to hitches and more particularly to a plow hitch for overcoming side draft.

The primary object of my invention resides in the provision of a hitch for association with gang, sulky and other plows for equalizing side draft therefor, thereby providing a hitch for increasing the efficient operation of a plow.

Another object of my invention resides in the provision of a novel means adjustably associated preferably with the beams of a gang plow for obviating side draft regardless of the number of animals required to pull the plow, said means also adjustably receiving the draft device or devices.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

In the drawings:—Figure 1 is a top plan view of my invention associated with the beams of a gang plow; and Fig. 2 is a side elevational view of my invention, the draft device being detached.

Referring more particularly to the drawings in which similar reference numerals designate like or corresponding parts throughout the different views, I have associated preferably with the beams 1 and 2 of a gang plow, my novel means for equalizing side draft, generally designated 3. The novel means in this instance consists of a draft bar 4, from one of the side edges of which project lateral ears 5, said ears being positioned adjacent the ends of the bar 4 and engageable through the medium of suitable fastening devices 6 to the free ends of the beams 1 and 2. The bar 4 is further provided with a plurality of uniformly spaced openings 7 to adjustably facilitate the attachment of sets of links 8 and 9 through the medium of nut and bolt arrangements 10, the opposite ends of the links extending forwardly on the bar and being removably associated with certain of a plurality of openings 11 to one side of another draft bar 12 through the medium of nut and bolt arrangements 13. These sets of links 8 and 9 are arranged in spaced relation with each other and one link of each set is arranged upon the upper surface of the bars 4 and 12 while the other link of each set are arranged upon the under surface of each bar as illustrated to advantage in Fig. 2 of the accompanying drawings. The free end of the bar 12 is further provided with a plurality of smaller openings 14 in which is adjustably mounted a clevis 15 through the medium of a nut and bolt arrangement 16, the clevis also having movably associated therewith a large draft tree 17. Different means for attaching draft devices to this tree 17 may be employed. In the present instance, the preferable draft means consists of double tree 18 which is movably and removably connected to the respective ends of the large tree 17 through the medium of hooks 19 and eyes 20. Swingle trees 21 are similarly connected to the respective ends of the double tree. A tongue 22 having a yoke 23 associated with the outer end is removably connected to one of the eyes 20 through the medium of a hook or the like 24.

The operation of my invention is as follows: Assuming that the gang plows, not shown, are arranged diagonally of the direction of travel, the links 8 and 9 are associated with the desired openings 7 in the bar 4 to the one side of the center of the bar 4 which is on the same side of the gang plows, not shown, which are positioned further from the bar than the other end of the diagonally disposed row of gang plows. The draft devices 18, being connected to the draft tree 17 which is in turn associated with the desired opening 14 in the free end of the bar 12 exerts a pull on the bar 6 which obviously equalizes the pull on the gang plow.

Although I have shown and described the preferred embodiment of my invention, I desire to be understood that I am not to be limited to the exact details shown, however, I desire that great stress be laid upon the arrangement of the novel means for adjustably associating draft devices with the beams of plows for equalizing the side draft.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent, is:—

A plow hitch for equalizing side draft on plows including in combination with two plow beams, a bar connected to the beams and provided with a plurality of openings throughout the length thereof, another bar arranged in advance of the first mentioned bar and provided with a plurality of openings, the openings in one portion of the bar being smaller than those in the other portion, links arranged above and below the bars in pairs and removably and adjustably connected in the large openings in one bar and in the openings in the other bar, a large tree, a clevis for removably and adjustably connecting the large tree with the smaller openings in the second mentioned bar, and other trees mounted in the respective ends of the large tree.

In testimony whereof I affix my signature in presence of two witnesses.

JAMES O. SHAFER.

Witnesses:
  H. G. MORRIS,
  FRANK VICE, Jr.

Copies of this patent may be obtained for five cents each, by addressing the "Commissioner of Patents, Washington, D. C."